M. S. SENTON.
COUPON CERTIFICATE OF DEPOSIT.
APPLICATION FILED JUNE 27, 1913.

1,141,838.

Patented June 1, 1915.
2 SHEETS—SHEET 1.

WITNESSES

INVENTOR
Moritz S. Senton
BY Munn & Co
ATTORNEYS

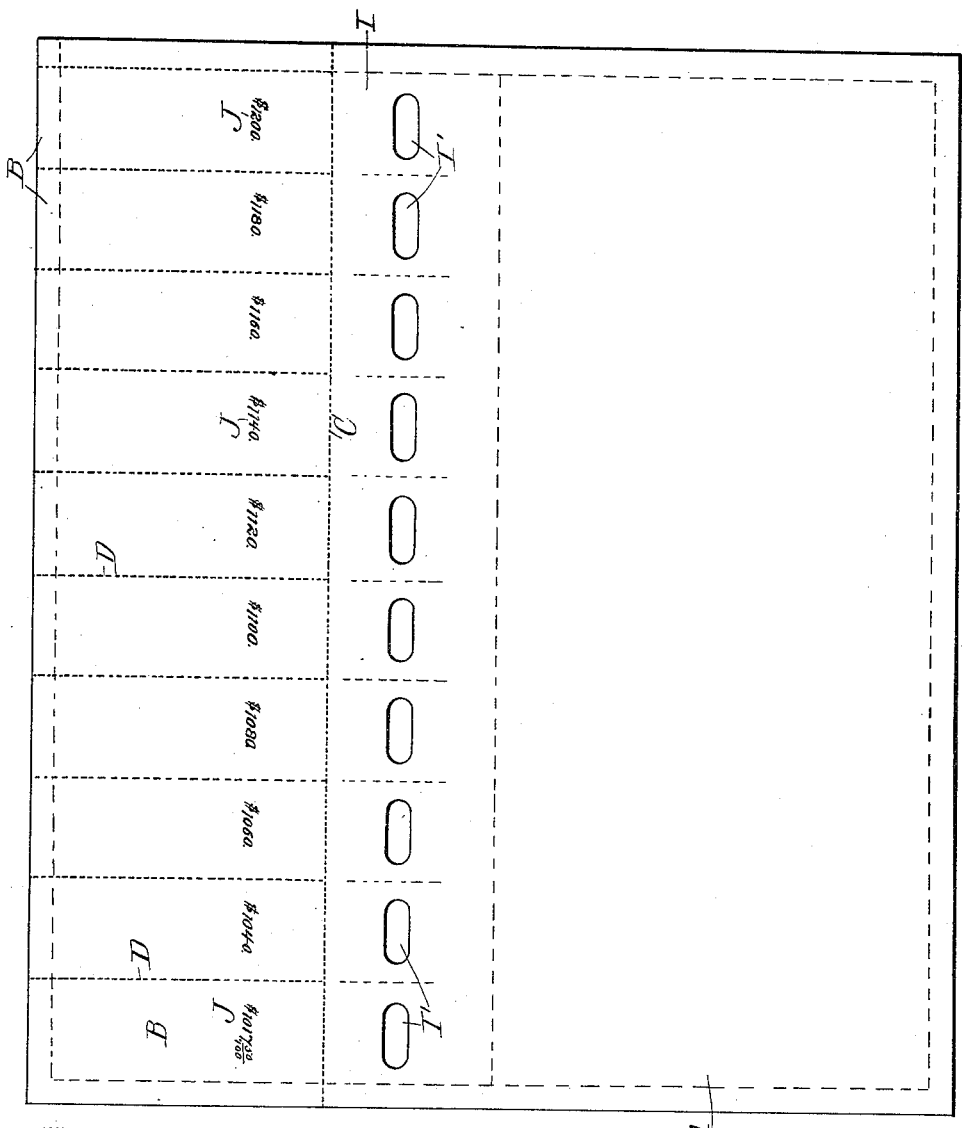

UNITED STATES PATENT OFFICE.

MORITZ S. SENTON, OF NEW ORLEANS, LOUISIANA.

COUPON CERTIFICATE OF DEPOSIT.

1,141,838.  Specification of Letters Patent.  Patented June 1, 1915.

Application filed June 27, 1913. Serial No. 776,083.

*To all whom it may concern:*

Be it known that I, MORITZ S. SENTON, a citizen of the United States, and a resident of New Orleans, in the parish of Orleans and State of Louisiana, have invented a new and Improved Coupon Certificate of Deposit, of which the following is a full, clear, and exact description.

The invention relates to instruments of obligation such as are issued by banks or other parties to depositors.

The object of the invention is to provide a new and improved coupon certificate of deposit, providing for two rates of interest, and arranged to show at all times the interest to which the depositor is entitled, thus rendering the coupon certificate advantageous and attractive to the public and to the bank issuing the same.

A further object is to offer an inducement to the owner for the latter to leave the original deposit and the accruing interest undisturbed for a given length of time by the provision of a bonus.

In order to accomplish the desired result use is made of a certificate of deposit provided with panels, each having an opening, and interest coupons arranged detachably and foldably adjacent the said panels and in register with the same, each coupon being provided at its back with the maturity value of the certificates at a given period of time.

A practical embodiment of the invention is represented in the accompanying drawings forming a part of this specification, in which similar characters of reference indicate corresponding parts in both views.

Figure 1 is a face view of the certificate of deposit; and Fig. 2 is a rear face view of the same.

The instrument of obligation consists essentially of a certificate of deposit A and a series of interest coupons B detachably and foldably associated with the said certificate of deposit A by the use of a row of perforations C arranged between one edge of the certificate A and the adjacent edges of the series of coupons B. The coupons B are detachable one from the other by transverse rows of perforations D, so that the coupons can be individually detached.

The certificate of deposit is provided on its face with the name E of the issuing bank or other party, blank spaces F for the signatures of the proper bank officials (president or cashier), a blank space G for the signature of the payee, and a statement H giving the amount of the deposit and to whom payable and redeemable at any interest-paying period together with either a low rate of interest, if the coupons are used, or a high rate of interest, if the coupons are not used. Thus, for instance, as shown in Fig. 1, the certificate of deposit is for $1,000 and the interest to be at 3½% per annum if collected every six months, and at the rate of 4% per annum if the coupons are not used.

The certificate of deposit A is provided with a series of panels I in register with the coupons B and adjacent to the line of perforation C, and each panel I is provided with an elongated opening I'.

The coupons B are arranged for a series of periods of time from the date of the certificate until its date of maturity, the coupons being successively numbered, and each coupon bears the value of the low rate of interest previously mentioned and referred to in the statement H. On the back of each of the coupons B (see Fig. 2) are printed the values J of the certificate of deposit at maturity when the coupons are detached and cashed in at the given periods of time, and the said maturity values J are so arranged that when the coupons B are folded along the row of perforations C onto the back of the certificate A, then the said values J appear in the openings I' of the panels I. For instance, as indicated in the drawings, when no coupon is detached the value of the certificate of deposit at maturity is $1200., as will appear in the first opening I' to the left, the amount $1200. being printed on the back of the coupon B numbered 1. In a like manner if one coupon is detached at the end of the first period of time, the maturity value of the certificate of deposit is $1180., which amount appears through the second opening I' of the second panel opposite to or in register with the coupon B marked 2. Thus the depositor can ascertain the value at maturity of the certificate of deposit at any time whether the coupons are detached or not at the expiration of the corresponding periods of time indicated on the coupons.

The certificate of deposit A is also provided adjacent the panels I with a statement K providing for the payment of a bonus in case none of the coupons B have been detached and collected. Thus, for instance, as shown, the bonus is $20, which, in addition to the interest of 4% paid at maturity and in case none of the coupons is detached, approximately amounts to compound interest at 4%. It is understood that in the example given if interest is collected every six months, by making use of the coupons B, the depositor receives 3½% interest per annum, and if the interest is not collected semi-annually and the certificate is allowed to mature, then in five years the interest has accrued at 4% and a bonus is provided for to the amount of $20.00, so that the depositor receives the original amount deposited and approximately compound interest at the rate of 4%. It will be noticed that if the depositor does not collect the interest, say for three years, and is obliged to collect upon the first coupon, then the value of the certificate will still be $1180., as appears in the second opening I' of the second panel, as previously explained, provided no further coupons are used until the certificate becomes due.

Savings banks have found that a great many of their depositors when they accumulate some money, desire to make a larger percentage than the one paid ordinarily say 3 or 3½% by issuing pass books, which method entails a great deal of bookkeeping and calculations at interest periods on the various amounts deposited and withdrawn during the previous six months, all this work would be obviated by the issuing of certificates in round sums, practically for a fixed period, therefore, the bank would be able to offer a better rate of interest to the public on these certificates without conflicting with their savings rules, knowing at all times the largest amount of certificates that could be presented in any month for redemption, by keeping a special register of same, under the rule that they are redeemable at any interest paying period. The register would have columns for every month in the year and a total column. By adding the amounts in each column, the banker would know how many months of interest were due on each total since last balancing of books, and the amount he would have to set aside in preparing a statement at any given time.

Having thus described my invention, I claim as new and desire to secure by Letters Patent:

1. A coupon certificate of deposit, comprising a certificate of deposit provided with a series of panels having openings, and interest coupons detachably and foldably connected with the said certificate of deposit adjacent the said panels and in register therewith the back of each coupon having maturity value of the certificate marked thereon, the said maturity value appearing at the corresponding panel opening on folding the coupons upon the back of the certificate.

2. A coupon certificate of deposit, comprising a certificate of deposit, a series of interest coupons detachable from one another and arranged along one edge of, and foldable with respect to the said certificate of deposit, the said certificate of deposit having a series of panels on its face and along its said edge, each of which panels is opposite to and corresponds with one of the coupons, and is provided with an opening through which a portion of one surface of its respective coupon will show when the series of coupons are folded upon the certificate of deposit.

3. A coupon certificate of deposit comprising a certificate of deposit having spaces marked out adjacent to and along one edge thereof and forming a plurality of panels, a plurality of coupons detachably connected to said edge of the certificate of deposit, said coupons being foldable on the back of the certificate and extending in a series therealong, each of said coupons bearing on its reverse side its respective maturity value of the entire certificate and being arranged opposite to one of the said panels and having its interest value on its obverse side, the said panels having openings in which the maturity value of the certificate appears when the coupons are folded upon the back of the two subscribing witnesses.

In testimony whereof I have signed my name to this specification in the presence of two witnesses.

MORITZ S. SENTON.

Witnesses:
A. WEHRLE,
R. J. REAMES.

Copies of this patent may be obtained for five cents each, by addressing the "Commissioner of Patents, Washington, D. C."

It is hereby certified that in Letters Patent No. 1,141,838, granted June 1, 1915, upon the application of Moritz S. Senton, of New Orleans, Louisiana, for an improvement in "Coupon Certificates of Deposit," an error appears in the printed specification requiring correction as follows: Page 2, line 95, claim 3, for the words "two subscribing witnesses" read *certificate;* and that the said Letters Patent should be read with this correction therein that the same may conform to the record of the case in the Patent Office.

Signed and sealed this 19th day of October, A. D., 1915.

[SEAL.] R. F. WHITEHEAD,
*Acting Commissioner of Patents.*